(12) United States Patent
Guntoro et al.

(10) Patent No.: US 11,715,019 B2
(45) Date of Patent: Aug. 1, 2023

(54) METHOD AND DEVICE FOR OPERATING A NEURAL NETWORK IN A MEMORY-EFFICIENT MANNER

(71) Applicant: Robert Bosch GmbH, Stuttgart (DE)

(72) Inventors: Andre Guntoro, Weil der Stadt (DE); Armin Runge, Wuerzburg (DE); Christoph Schorn, Leonberg (DE); Jaroslaw Topp, Renningen (DE); Sebastian Vogel, Schaidt (DE); Juergen Schirmer, Heidelberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 703 days.

(21) Appl. No.: 16/298,335

(22) Filed: Mar. 11, 2019

(65) Prior Publication Data
US 2019/0279095 A1    Sep. 12, 2019

(30) Foreign Application Priority Data

Mar. 12, 2018  (DE) .......................... 102018203709.4

(51) Int. Cl.
*G06N 3/084* (2023.01)
*G06N 3/04* (2023.01)
*G06N 3/10* (2006.01)
*G06F 17/16* (2006.01)

(52) U.S. Cl.
CPC .............. *G06N 3/10* (2013.01); *G06F 17/16* (2013.01); *G06N 3/04* (2013.01); *G06N 3/084* (2013.01)

(58) Field of Classification Search
CPC .......... G06F 17/16; G06N 3/084; G06N 3/04; G06N 3/063
See application file for complete search history.

(56) References Cited

U.S. PATENT DOCUMENTS

| 10,733,767 B2 * | 8/2020 | Cho ......................... G06T 9/002 |
| 2017/0011288 A1 * | 1/2017 | Brothers ............... G06F 9/3017 |
| 2018/0084253 A1 * | 3/2018 | Thiagarajan ......... H04N 19/625 |
| 2018/0218518 A1 * | 8/2018 | Yan ......................... G06N 3/063 |
| 2018/0239992 A1 * | 8/2018 | Chalfin ............. G06K 9/00986 |
| 2018/0253635 A1 * | 9/2018 | Park ......................... G06F 7/535 |

(Continued)

OTHER PUBLICATIONS

Jiang, J., Trundle, P. and Ren, J., 2010. Medical image analysis with artificial neural networks. Computerized Medical Imaging and Graphics, 34(8), pp. 617-631.)J (Year: 2010).*

(Continued)

*Primary Examiner* — Oluwatosin O Alabi
(74) *Attorney, Agent, or Firm* — Norton Rose Fulbright US LLP; Gerard Messina

(57) ABSTRACT

A method for operating a calculation system including a neural network, in particular a convolutional neural network, the calculation system including a processing unit for the sequential calculation of the neural network and a memory external thereto for buffering intermediate results of the calculations in the processing unit, including: incrementally calculating data sections, which each represent a group of intermediate results, with the aid of a neural network; lossy (Continued)

compression of one or multiple of the data sections to obtain compressed intermediate results; and transmitting the compressed intermediate results to the external memory.

13 Claims, 6 Drawing Sheets

(56) References Cited

U.S. PATENT DOCUMENTS

2018/0293758 A1* 10/2018 Bar-On .................. G06T 9/002
2019/0190538 A1*  6/2019 Park ...................... G06N 3/063

OTHER PUBLICATIONS

Ashraf, Robina, and Muhammad Akbar. "Absolutely lossless compression of medical images." In 2005 IEEE Engineering in Medicine and Biology 27th Annual Conference, pp. 4006-4009. IEEE, 2006. (Year: 2006).*

Verhelst M, Moons B. Embedded deep neural network processing: Algorithmic and processor techniques bring deep learning to iot and edge devices. IEEE Solid-State Circuits Magazine. Nov. 15, 2017;9(4):55-65. (Year: 2017).*

Y. Wang et al., "CNNPACK: Packing Convolutional Neural Networks in the Frequency Domain", Advances in Neural Information Processing Systems 29, Barcelona, Spain, 2016, pp. 1-9.

W. Chen et al., "Compressing Convolutional Neural Networks in Frequency Domain", Proc. ACM SIGKDD Conference on Knowledge Discovery and Data Mining (KDD), San Francisco, USA, 2016, pp. 1-10.

J. H. Ko et al., "Adaptive Weight Compression for Memory-Efficient Neural Networks", in Design, Automation Test in Europe Conference Exhibition (2017), Lausanne, Switzerland, 2017.

JPEG in Wikipedia, downloaded Oct. 2, 2018; https://en.wikipedia.org/w/index.php?title_JPEG&oldid=829011008.

Embedded Vision Alliance: Deep Learning for Object Recognition: DSP and Specialized Processor Optimizations; downloaded May 28, 2019; https://www.embedded-vision.com/platinum-members/ . . . , pp. 1-8.

Han, et al.: "Deep Compression: Compressing Deep Neural Networks with Pruning, Trained Quantization and Huffman Coding" in UCLR 2016. [Abstract only].

Han, et al.: "EIE: Efficient Inference Engine on Compressed Deep NEural Network", in 2016 ACM/IEEE, pp. 243-254.

Parashar, et al.: "SCNN: An Accelerator for Compressed-sparse Convolutional Neural Networks" in SIGMARCH Comput. Achit. News 45 (2) (2017), pp. 27-40.

\* cited by examiner

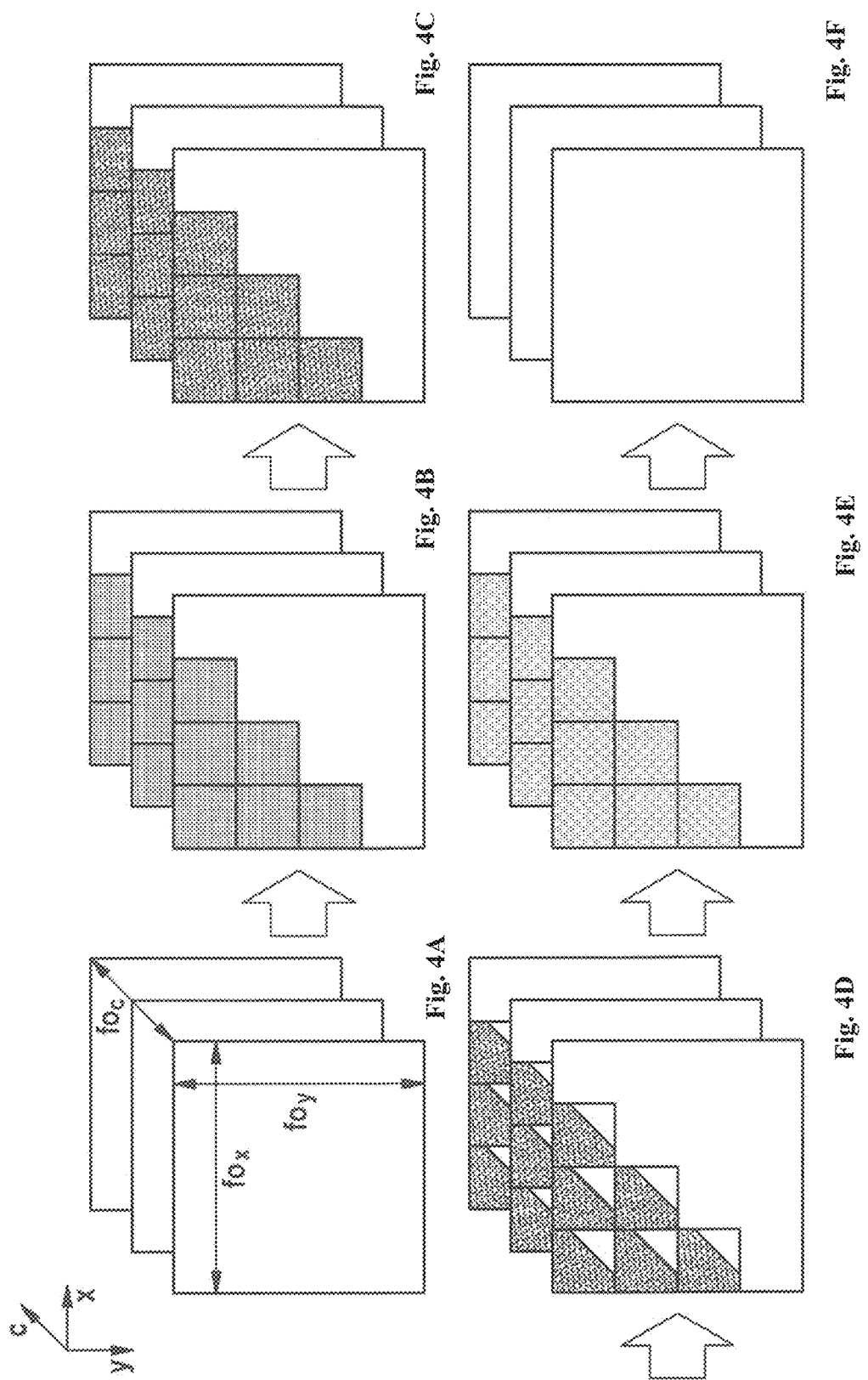

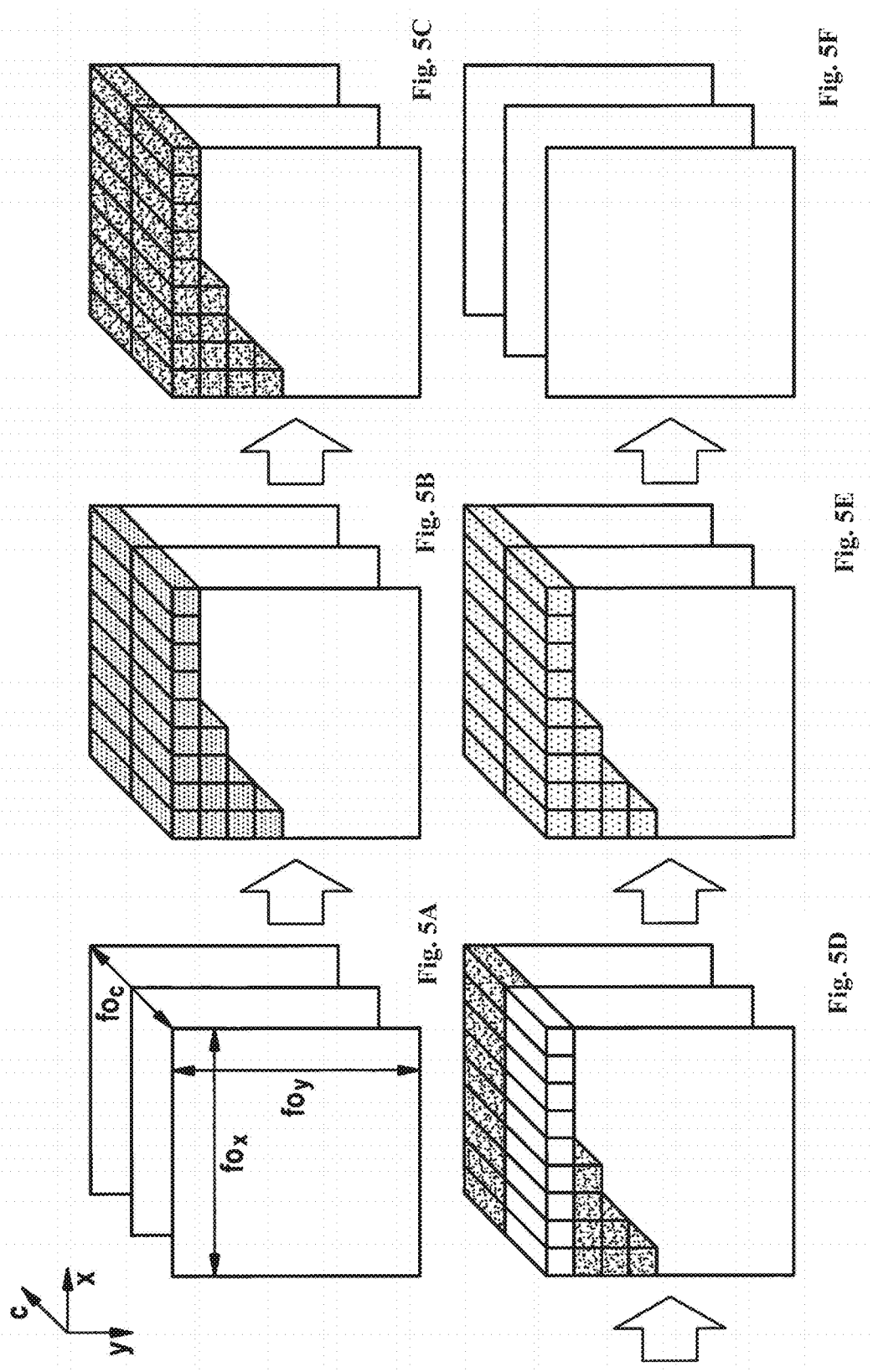

METHOD AND DEVICE FOR OPERATING A NEURAL NETWORK IN A MEMORY-EFFICIENT MANNER

CROSS REFERENCE

The present application claims the benefit under 35 U.S.C. § 119 of German Patent Application No. DE 102018203709.4 filed on Mar. 12, 2018, which is expressly incorporated herein by reference it its entirety.

FIELD

The present invention relates to neural networks, and in particular to measures for buffering intermediate calculation results of individual neuron layers.

BACKGROUND INFORMATION

Neural networks used in particular for image processing have to process large data volumes. For this purpose, calculation hardware is often available for a calculation of a neural network which carries out the calculation of only a portion of the neural network, the multiple use of the calculation hardware being provided by an algorithm. The calculation results obtained during the calculation of the portion of the neural network are buffered for this purpose and retrieved as needed.

For example, calculation results of a single neuron layer which have a size of approximately 134 MB at (pixel) word sizes of 8 bits may result for an image having an input resolution of 2048×1024 pixels. It is no longer possible to buffer this data volume in a cache memory during the calculation of the neural network since the size of the cache memory is generally limited.

It is therefore often necessary to transfer the intermediate results of the neural network into an external memory outside the calculation hardware for the neural network, and to read them back from there as needed. However, compared to accessing (calculation hardware-) internal registers or buffers (caches), accessing the external memory requires more energy and a higher access time. A calculation in a neural network for high data volumes is thus not limited by the computing power of the calculation hardware, but by the bandwidth of the data transmission between the calculation hardware and the external memory for storing intermediate results.

Y. Wang et al., "CNNpack: Packing Convolutional Neural Networks in the Frequency Domain", Advances in Neural Information Processing Systems 29, Barcelona, Spain, 2016 and W. Chen et al., "Compressing Convolutional Neural Networks in Frequency Domain", Proc. ACM SIGKDD Conference on Knowledge Discovery and Data Mining (KDD), San Francisco, USA, 2016 describe reducing the size of network parameters, i.e., weightings and bias values, by transferring the network parameters into a frequency domain, and reducing the parameter size by being able to image similar values in the frequency domain onto a shared value using clustering methods. In this way weight sharing is achieved.

J. H. Ko et al., "Adaptive Weight Compression for Memory-Efficient Neural Networks", in Design, Automation Test in Europe Conference Exhibition (DATE), Lausanne, Switzerland, 2017, describe compressing the network parameters for the neurons of the neural network, the compression method establishing the compression rate with the aid of a quality factor which is dependent on a training step. The compression algorithm is similar to a jpeg image compression.

The two latter methods, however, relate to the compression of previously known network parameters, which in general only have to be loaded, but not buffered.

SUMMARY

According to the present invention, an example method for operating a neural network, in particular a convolutional neural network, and a neural network and a calculation system are provided.

Further example embodiments are described herein.

According to a first aspect of the present invention, a method for operating a calculation system including a neural network, in particular a convolutional neural network, is provided, the calculation system including a processing unit for the sequential calculation of the neural network and a memory external thereto for buffering intermediate results of the calculations in the processing unit, including the following steps:

incrementally calculating data sections, which each represent a group of intermediate results, with the aid of a neural network;

lossy compression of one or multiple of the data sections to obtain compressed intermediate results; and transmitting the compressed intermediate results to the external memory.

The above method provides to store results of calculations of a neural network which are to be further processed as intermediate results by the or a further neural network external to the processing unit (calculation hardware), i.e., not in registers or other buffers which are an integral part of the processing unit (calculation hardware). These intermediate results are to be stored in an external memory and, for this purpose, are compressed prior to the transmission into the external memory to reduce the data volume to be transmitted between the processing unit and the external memory. This is achieved by compression and decompression in the processing unit or, if necessary, in a stage between the processing unit and the external memory.

A compression of data in general uses repetitions of data elements to reduce the size of the data. For example, a run length compression uses the option of encoding a sequence of identical values (e.g., zeros occurring frequently in neural networks) by indicating their lengths. If, by manipulating the data to be compressed, it is achieved that these have one or multiple preferably large areas of sequences of identical data elements or zeros, such a run length compression is particularly effective.

It may be provided that, for the lossy compression, the data sections are each transformed into a frequency domain, and the transformed data sections are filtered element-wise in the frequency domain to obtain modified data sections.

The element-wise filtering may include a multiplication of a portion of the elements of the transformed data sections with 0 to obtain modified data sections including a number of "0" elements which is greater than the number of "0" elements in the original data sections of an input feature map.

"Element-wise filtering" herein denotes an operation in which the data elements of the transformed data sections are set to zero. Mathematically, this "setting to zero" corresponds to an element-wise multiplication with a compression matrix A whose entries $a_{kl}$ may be zero. Hereafter, "filtering" shall be understood to mean such setting to zero or element-wise multiplication, where $$A = \begin{pmatrix} a_{11} & \cdots & a_{1n} \\ \vdots & \ddots & \vdots \\ a_{n1} & \cdots & a_{nn} \end{pmatrix}$$

In particular, one or multiple modified data sections may be encoded, in particular together, with the aid of a predefined encoding method to obtain the compressed intermediate results, in particular with the aid of run length encoding or entropy encoding.

According to the above method, the data sections to be compressed are manipulated in such a way that they are represented by a data sequence which includes one or multiple preferably large areas of sequences of zeros. This manipulation may be lossy, so that the used compression method overall is lossy. The use of a lossy compression for storing intermediate results of a calculation of a neural network is generally permissible since neural networks, compared to other algorithms, are particularly robust against noise (quantization noise, single event faults etc.).

Prior to the compression of the data sections, these are modified in such a way that these have one or multiple preferably large areas of sequences of identical data elements or zeros. For this purpose, a frequency transformation may be provided, for example, which includes a transmission of the intermediate results to be compressed as input data into a frequency domain. The frequency domain data, i.e., the data sections transmitted into the frequency domain, may be filtered in a simple manner according to frequency components so that, after this filtering of the frequency domain data, larger data areas result which include only zeros. These may be encoded in a suitable manner, e.g., with the aid of a run length encoding or an entropy encoding, or be compressed thereby.

According to one specific embodiment, a compression matrix may be applied to the transformed data sections for the element-wise filtering, the matrix being separately predefined in particular for each neuron or calculation layer of the sequential calculation of the neural network.

In particular, the compression matrix may be matched to the encoding method of the transformed data sections in such a way that a better compression is achieved than with a direct application of the encoding method to the non-transformed data sections.

The filtering in the frequency domain may be carried out, for example, with the aid of the compression matrix, which makes it possible to element-wise filter the frequency domain data transformed into the frequency domain, one element of the data sections transformed into the frequency domain corresponding to a frequency component having a frequency.

In particular, the compression matrix may be predefined in such a way that higher-frequency components of the transformed data sections are filtered.

As an alternative, the compression matrix may be predefined in that, during a training of the neural network, matrix elements $a_{kl}$ of the compression matrix A for each calculation layer are trained together with neuron parameters of neurons of the neural network, in particular with the aid of a back-propagation method.

The compression matrix may be modified in a suitable manner to adapt the reduction of the frequency domain data. The compression matrix may be set for this purpose during the training of the neural network or be subsequently added to an already trained neural network. In the case of the addition to an already trained network, the learning rate of the compression matrix and of the network parameters may be different or the network parameters may be fixed during the learning of the compression matrix. In the case of a layer-by-layer calculation of the neural network, a dedicated compression matrix may be determined for each of the neuron layers. The compression matrices furthermore determine how strongly calculation results of individual neuron layers may be compressed.

The adaptation of the compression matrix during the training process of the neural network makes it possible to minimize the errors introduced into the neural network by the compression or to limit these to below a predefined error value. The above method may be applied particularly well to convolutional neural networks (CNN) which were trained by a conventional, non-specialized training. The convolutions are carried out during the execution of a convolutional neural network in the spatial domain. For the possibly lossy compression in the frequency domain, the data to be compressed are therefore divided into tiles of a smaller and more defined size.

The separation of the calculation by the neural network and the compression of the calculation results make it possible that the compression method according to the present invention does not need to be taken into consideration in a development of a neural network, and it is also possible to provide a compression unit separately from the processing unit. Moreover, the calculation unit may be switched on and off dynamically to provide a setting option which enables a trade-off between accuracy of the calculation of the neural network and the compression rate (i.e., the required memory bandwidth and the calculation duration). The introduced lossy compression method has the advantage to set the compression rate in such a way that it is possible to provide guaranteed information about the resulting, required memory bandwidth. This is advantageous, in particular, for use in real time critical systems.

Moreover, the compressed intermediate results may be retrieved from the external memory again for a calculation with the aid of the neural network, they may be decompressed, and a further calculation may be carried out as a function of the decompressed intermediate results.

It may be provided that the neural network corresponds to a convolutional neural network including multiple neuron layers, which are each assigned neuron parameters, one element of an output feature map being obtainable by applying the neuron parameters assigned to the output feature map to a data section of one or multiple input feature maps.

Moreover, the compressed intermediate results may be transmitted to the external memory, the compressed intermediate results being retrieved from the external memory for a further calculation with the aid of the neural network and be decompressed to obtain decompressed data sections.

It may be provided that, after the retrieval of the compressed intermediate results from the external memory, they are decoded using a decoding method and are subsequently back-transformed to obtain the decompressed intermediate results. The decoding method is preferably selected in a complementary manner to the encoding method. Moreover, the back-transformation corresponds to a process complementary to the transformation into the frequency domain.

According to a further aspect, a calculation system including a neural network, in particular a convolutional neural network, is provided, the calculation system including a processing unit for the sequential calculation of the neural network and a memory external thereto for buffering intermediate results of the calculations in the processing unit, the processing unit being designed to:

incrementally calculate data sections, which each represent a group of intermediate results, with the aid of a neural network;
   conduct a lossy compression of one or multiple of the data sections to obtain compressed intermediate results; and
   transmit the compressed intermediate results to the external memory.

Furthermore, a decompression unit may be provided, which is designed to retrieve the compressed intermediate results from the external memory for a calculation with the aid of the neural network, to decompress them, and to carry out a further calculation as a function of the decompressed intermediate results.

BRIEF DESCRIPTION OF THE DRAWINGS

Specific embodiments of the present invention are described in greater detail hereafter based on the figures.

FIGS. 4A through 4F show an input feature map of a convolutional neural network, an input feature map divided into data tiles, an input feature map transformed into the frequency domain, an input feature map which has been transformed into the frequency domain and to which a compression matrix has been applied, a feature map which has been back-transformed from the frequency domain and to which the compression matrix has been applied, and a continuously shown input feature map.

FIGS. 5A through 5F show an illustration of the method when the division into data sections is carried out along the channels.

DETAILED DESCRIPTION OF EXAMPLE EMBODIMENTS

Figure 1:
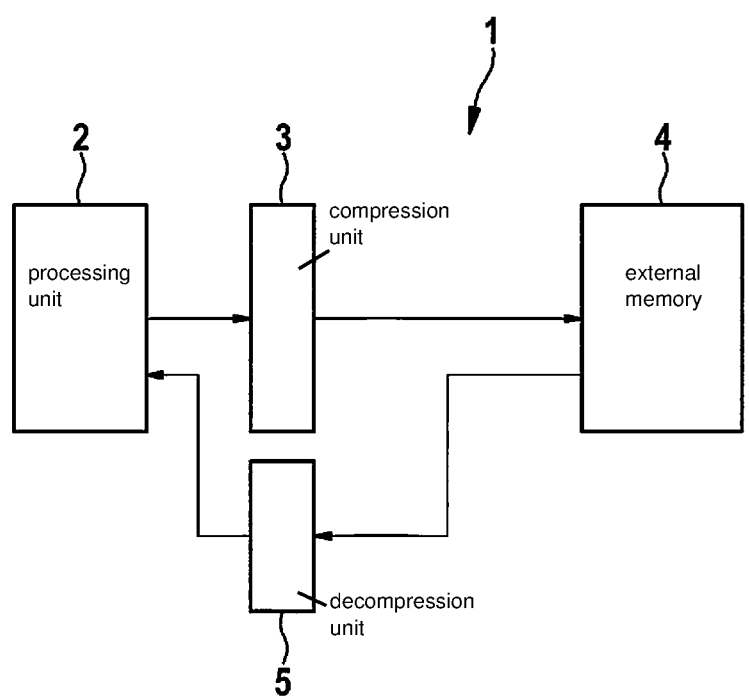
FIG. 1 shows a schematic representation of a calculation system for calculating a neural network.

FIG. 1 shows a schematic representation of a calculation system 1 including a processing unit 2. Processing unit 2 includes a processor and/or another hardware unit, which are designed or particularly suited for calculating a neural network. Processing unit 2 may be provided in such a way that components or hardware units are used multiple times for one calculation pass. In particular, hardware units may calculate a single neuron layer or provide one or multiple calculation steps of an incremental calculation, e.g., of a convolutional neural network.

During the calculation of complex neural networks, the calculations are incrementally carried out consecutively by processing unit 2, respective intermediate results resulting in each case which are not further used in directly following calculations, e.g., not until a calculation of a further neuron layer. These intermediate results may correspond to such large data volumes that they may not be readily buffered in processing unit 2.

It is therefore provided to transfer intermediate results from calculations of processing unit 2 into an external memory 4 and to retrieve them from there again when they are needed for subsequent calculations.

For this purpose, a compression unit 3 is provided to compress the intermediate results of the calculations of the neural network. The compressed calculation results are then transmitted to external memory 4 and stored there.

To further process the previously stored intermediate results, they may be read out from external memory 4 and decompressed with the aid of a decompression unit 5 to utilize the decompressed buffered intermediate results for a next calculation step by the neural network.

The compression or decompression of intermediate results during the calculation of neural networks may be usefully applied in particular when the input data is or the intermediate results are further processed sectionally after a calculation of a neuron layer with the aid of a neural network. This is the case, in particular, with convolutional neural networks. For example, such neural networks may be used for the perception of images, it being possible to regard the output of a neuron layer having the size $fo_x \times fo_y \times fo_c$ as $fo_c$ different filtered 2D matrices. The individual so-called channels include feature maps of the size $fo_x \times fo_y$. The processing by the convolutional neural network is one or multiple convolution(s) of the input data using the network parameters (network weights) ascertained in a training process with the aid of generally highly parallelized calculation elements designed as hardware (e.g., multiply-accumulate units, MAC units) of processing unit 2. The network parameters may be regarded as filter coefficients or filters.

For this purpose, the input and output feature maps are divided into data sections (so-called tiles) of the dimension $t_x \times t_y$. These tiles are processed sequentially by the corresponding calculation elements of processing unit 2. In this way calculation results for the output feature maps are obtained, the input feature maps according to the division into tiles being sequentially transferred into tiles of the output feature maps. The calculation results are collected for multiple or all tiles and may, in turn, be used as intermediate results for a calculation of a next layer or possibly correspond to the output data of the neural network. Since the next neuron layer is in general only calculated when all tiles of a feature map have been processed, it is necessary to buffer the intermediate results. For this purpose, the intermediate results undergo a tile-wise compression and are transmitted to external memory 4.

Due to the division into tiles, it is possible to access the data in a block-wise or tile-wise manner.

Hereafter, the compression for the calculation of a tile is described, by way of example a tile having dimension D of 8×8 being assumed.

Figure 2:
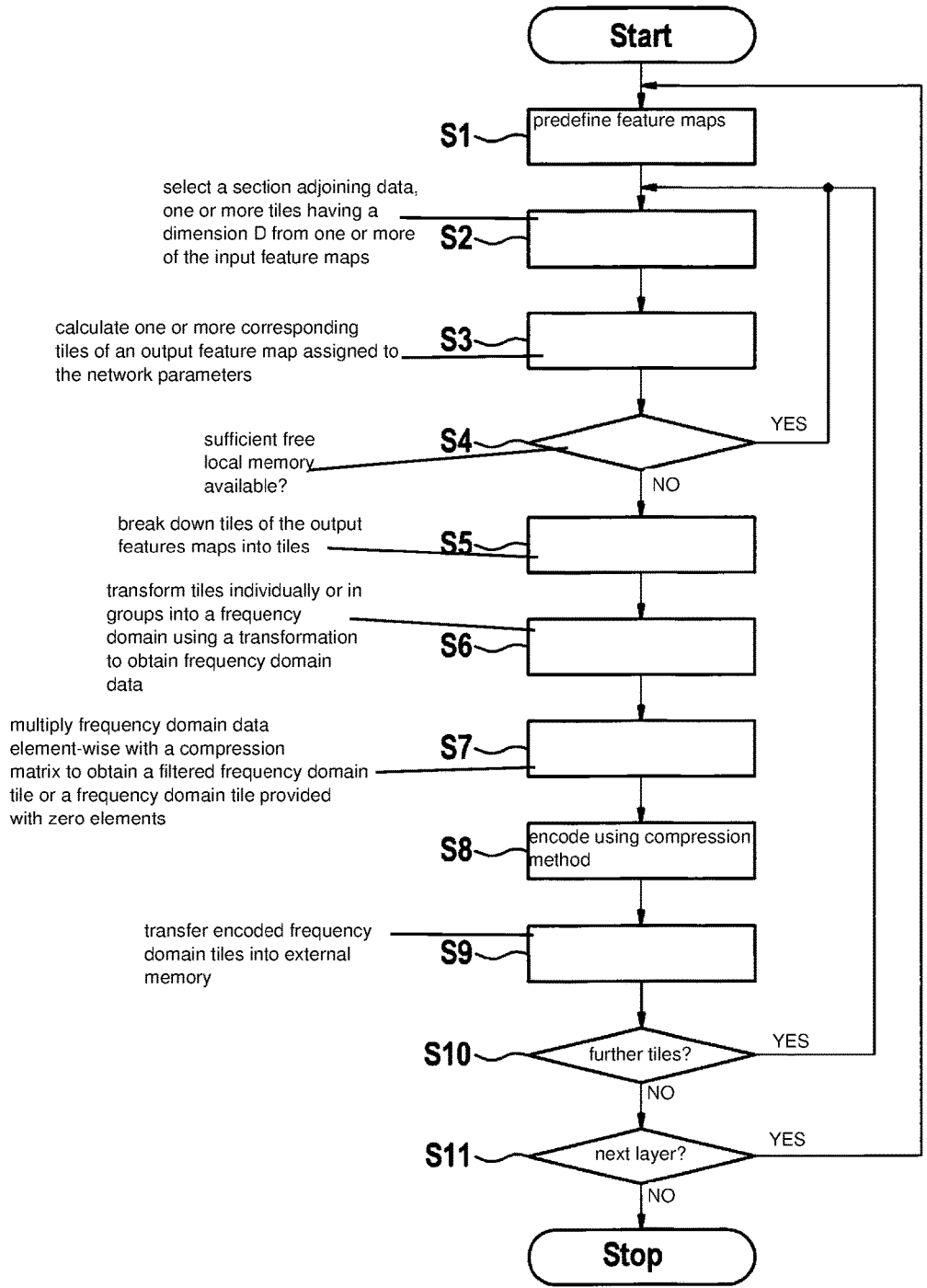
FIG. 2 shows a flow chart for illustrating a method for compressing intermediate results of a calculation in a neural network for the external storage.

FIG. 2 shows a flow chart to illustrate a method for operating a neural network based on one or multiple input feature map(s) and network parameters (network weights) predefined for this purpose for calculating one or multiple output feature map(s). Furthermore, FIGS. 3A through 3E illustrate the compression method based on an exemplary 8×8 tile.

Initially, in step S1 one or multiple feature maps are predefined, to which a possibly first neuron layer of the neural network is to be applied.

According to a sequence rule, in step S2 a section of adjoining data, one or multiple so-called tiles, having dimension D is selected from one or multiple of the input feature map(s) and thereafter, in step S3, one or multiple corresponding tile(s) of an output feature map assigned to the network parameters is calculated therefrom with the aid of the network parameters.

The network parameters assigned to an output feature map are also referred to as kernels. Such a kernel represents a parameterized unit, whose parameter is predefined by the training process of the neural network for the certain feature map and the certain neuron layer/calculation layer. The kernel is essentially used to calculate the elements of the output feature map by imaging the $t_x \times t_y$ input values of a tile of the input feature map onto an output value of the output feature map.

In step S4, it is checked whether sufficient free local memory is available for the intermediate results of a possibly further calculation of a tile of output feature maps in the calculation unit. If this is not the case (alternative: no), the method is continued with step S5; otherwise (alternative: yes), a jump back to step S2 takes place to calculate the next tile of the selected output feature map.

Figure 3A:
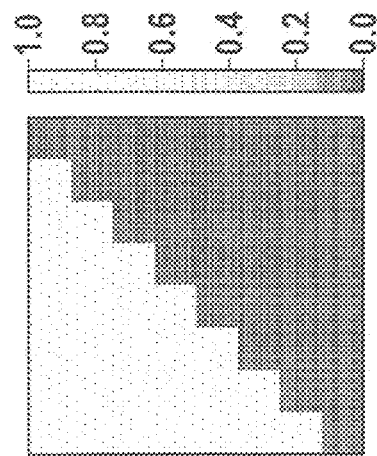
FIGS. 3A through 3E show an illustration of the compression method based on an exemplary data section.

In step S5, the tiles of the output feature maps already obtained in this way are broken down into tiles, in particular of dimension $D=t_x \times t_y$. FIG. 3A shows a tile with the original pixel distribution.

Figure 3B:
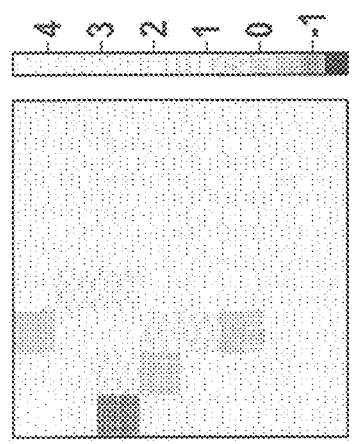

In step S6, the tiles are transformed individually or in groups into a frequency domain using a transformation to obtain frequency domain data of dimension $D=t_x \times t_y$ (frequency domain tiles). A predefined sequence of the individual pixels of the tile is considered a temporal or spatial sequence (time or spatial domain), so that a transformation into the frequency domain is possible. FIG. 3B shows the 8×8 tile of FIG. 3A after a transformation into the frequency domain.

The transformation may be, for example, a discrete cosine transform, a discrete sine transform, a Fourier transform, a fast Fourier transform, a Hadamard transform or the like. The following applies, for example, to the 2D DCT transform of a tile matrix X ($t_x=t_y=n$ having been written here by way of example):

$$DCT^{2D}\{X\} = CXC^T$$

$$C \in C^{n \times n}, C = \begin{pmatrix} c_{11} & \cdots & c_{1n} \\ \vdots & \ddots & \vdots \\ c_{n1} & \cdots & c_{nn} \end{pmatrix}$$

$$c_{ij} = s_i \cdot \cos\left((i-1)\left(j-\frac{1}{2}\right)\frac{\pi}{n}\right)$$

$$s_i = \begin{cases} \sqrt{\frac{1}{n}} & i=1 \\ \sqrt{\frac{2}{n}} & i>1 \end{cases}$$

Subsequent to the transformation of the tiles into the frequency domain, in step S7 the frequency domain data are multiplied element-wise with a compression matrix A of the size $t_x \times t_y$ predefined for the particular neuron layer or feature map to obtain a filtered frequency domain tile or a frequency domain tile provided with zero-elements.

Figure 3C:
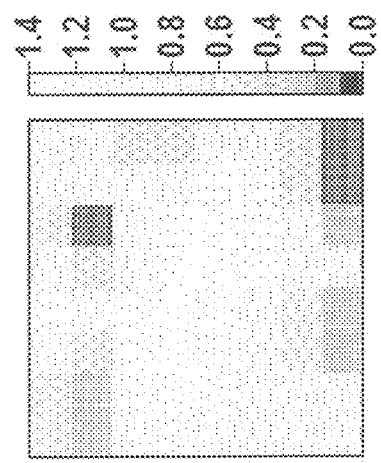
Figure 3D:
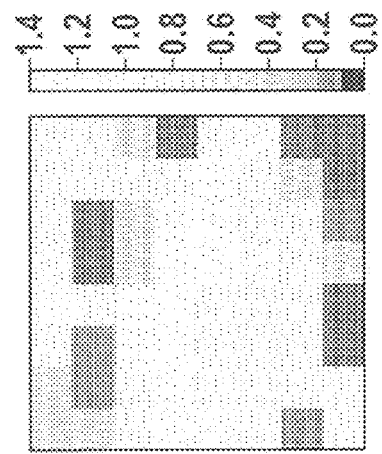

FIG. 3C shows an exemplary compression matrix, the light entries corresponding to a value of 1 and the dark entries corresponding to a value of 0. This compression matrix is by way of example, and values between 0 and 1 may also be assumed. FIG. 3D shows a frequency domain tile to which the compression matrix has been applied (transformed data section).

Depending on the entries of the compression matrix A, a change in the frequency domain data may possibly result (filtered data section).

In step S8, the tile which was transformed into the frequency domain and to which the compression matrix A was applied is encoded with the aid of a suitable compression method. The frequency domain tile modified with the aid of the compression matrix includes a larger number of areas and longer ones including consecutive zeros, which may be compressed particularly effectively, such as with the aid of the run length encoding method or with the aid of entropy encoding. In this way, a high compression rate may be achieved, which results only in minor information losses regarding the application and calculation of the neural network. The encoded frequency domain tiles are transferred into external memory 4 in step S9.

In step S10, it is checked whether further tiles of the feature maps are to be calculated in a corresponding manner. If this is the case (alternative: yes), a jump back to step S2 takes place, and the method of steps S2 through S9 is repeated for further tiles of the feature maps. Otherwise (alternative: no), the method is continued with step S10.

In step S11, it is checked whether a next layer of the neural network is to be calculated based on the calculation results previously determined from the feature maps. If this is the case (alternative: yes), the method is repeated by jumping back to step S1 based on feature maps resulting from the buffered encoded feature maps. Otherwise (alternative: no), the buffered output feature maps represent the output of the neural network in compressed form. They may be decoded for further use by decoding corresponding to the compression method used.

To use the frequency domain tiles of the feature maps from external memory 4 for carrying out a renewed calculation, the encoded frequency domain tiles of the feature maps are calculated by applying the decompression method, corresponding to the compression method of step S8, in decompression unit 5, and thereafter are back-transformed by the inverse frequency transformation.

The tiles loaded from the external memory are situated in the frequency domain due to the compression method and were encoded, and thus stored in compressed form. These tiles are initially decoded in a subsequent calculation step after being loaded from the external memory, i.e., decoded from an RLE representation or an entropy encoding, and thereafter are back-transformed from the frequency domain into the spatial domain (modified data section) to create a modified tile of an input feature map of the following neuron layer. Only thereafter is this modified data section transferred into an output feature map assigned to the network parameters with the aid of the network parameters.

Figure 3E:
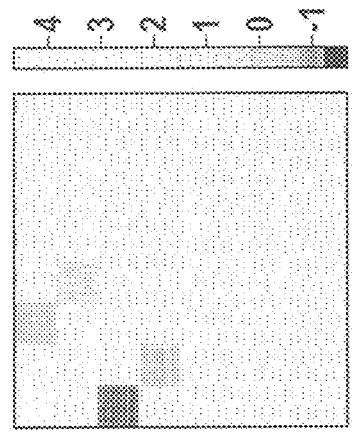

FIG. 3E shows a tile resulting from back-transformation of the frequency domain tile to which the compression matrix has been applied. It is apparent that the image of FIG. 3E is very similar to the image of FIG. 3A.

For example, the original data do not change as a result of the back-transformation if compression matrix A exclusively includes entries of "1".

The application of compression matrix A to the frequency domain tiles corresponds to the application of a digital filter. The further the entries are situated on the top left in compression matrix A, the more low frequency components are applied or filtered. Conversely, the further the entries are situated on the bottom right in compression matrix A, the more high frequency components are applied or filtered. In the case of a compression matrix having entries of "0" in the bottom right half, fewer fluctuations result after the back-transformation in the spatial domain, i.e., high frequency components of the entries of the back-transformed output feature map are reduced or removed. Nonetheless, the basic structure of the output feature map remains present.

It was established that higher-frequency frequency components are less relevant for the representation error of the neural network than lower-frequency frequency components for the transmission by a neuron layer. It is therefore possible to select a compression matrix which includes zeros in the entries corresponding to high-frequency frequency components for the compression of intermediate results of a neural network.

In a further variant, the data reduction may result in that the entry of a frequency domain tile is set to zero prior to the encoding in step S8 when the respective corresponding frequency component in the compression matrix drops below a limiting value. This means the frequency filtering is selected as a function of the corresponding entry in the compression matrix.

In FIGS. 4A through 4F, the entire process is applied to input data given by feature maps (FIG. 4A) in multiple channels. The division of each of the feature maps into tiles (FIG. 4B) of equal size is apparent, as is the processing of the tiles by transformation (FIG. 4C) into the frequency domain and the application of compression matrix A (FIG. 4D) to obtain the modified feature maps (FIG. 4F). The modified frequency domain tiles (FIG. 4D) are stored into an external memory after they were encoded/compressed using a suitable method (RLE or entropy encoding). For reading the stored data back in, the encoded frequency domain tiles are retrieved again, decoded and subsequently back-transformed. (FIG. 4E)

As an alternative, the division of the input data may take place along the channels, so that one-dimensional input data vectors x may be processed, instead of tiles of the input feature map. For the one-dimensional frequency transformation, the following transformation rule then applies:

$$DCT^{1D}\{x\} = xA^T$$

The procedure is schematically illustrated in FIGS. 5A through 5F corresponding to FIGS. 4A through 4F.

A separate compression matrix may be predefined for each neuron layer. If necessary, separate compression matrices may be predefined for each of the channels.

For each of the compression matrices, a number of elements corresponding to dimension $D=t_x \times t_y$ exists in the compression matrices. They have to be set manually to a suitable compromise between compression rate and minimum error of the calculation of the neural network. This process is complex. It is therefore proposed to optimize the elements of the compression matrices in an adaptation method. This may be carried out, for example, together with the training of the neural network. For example, the elements of the compression matrices may be optimized together with the coefficients of the neural network with the aid of a training algorithm which is conventional per se, such as a back-propagation algorithm. This means that the compression matrices are learned to the same degree as the neuron parameters. Thus, the need of a manual optimization of the elements of the compression matrices is dispensed with, and the compression of the individual neuron layers is set automatically, taking the compression of other neuron layers into consideration.

In detail, the optimization is carried out during the training method by applying a further term to the cost function underlying the optimization (see back-propagation algorithm) during the training of the neural network. This term may be a standard (e.g., L1 standard) of the coefficients of the compression matrices. The additional term acts like a regularization here. For the simultaneous training of the neuron parameters of the neurons of the neural network and of the elements of the filter matrix, the regularization may be weighted with a factor $\alpha \in [0, 0.001]$ in the cost function.

Figure 6:
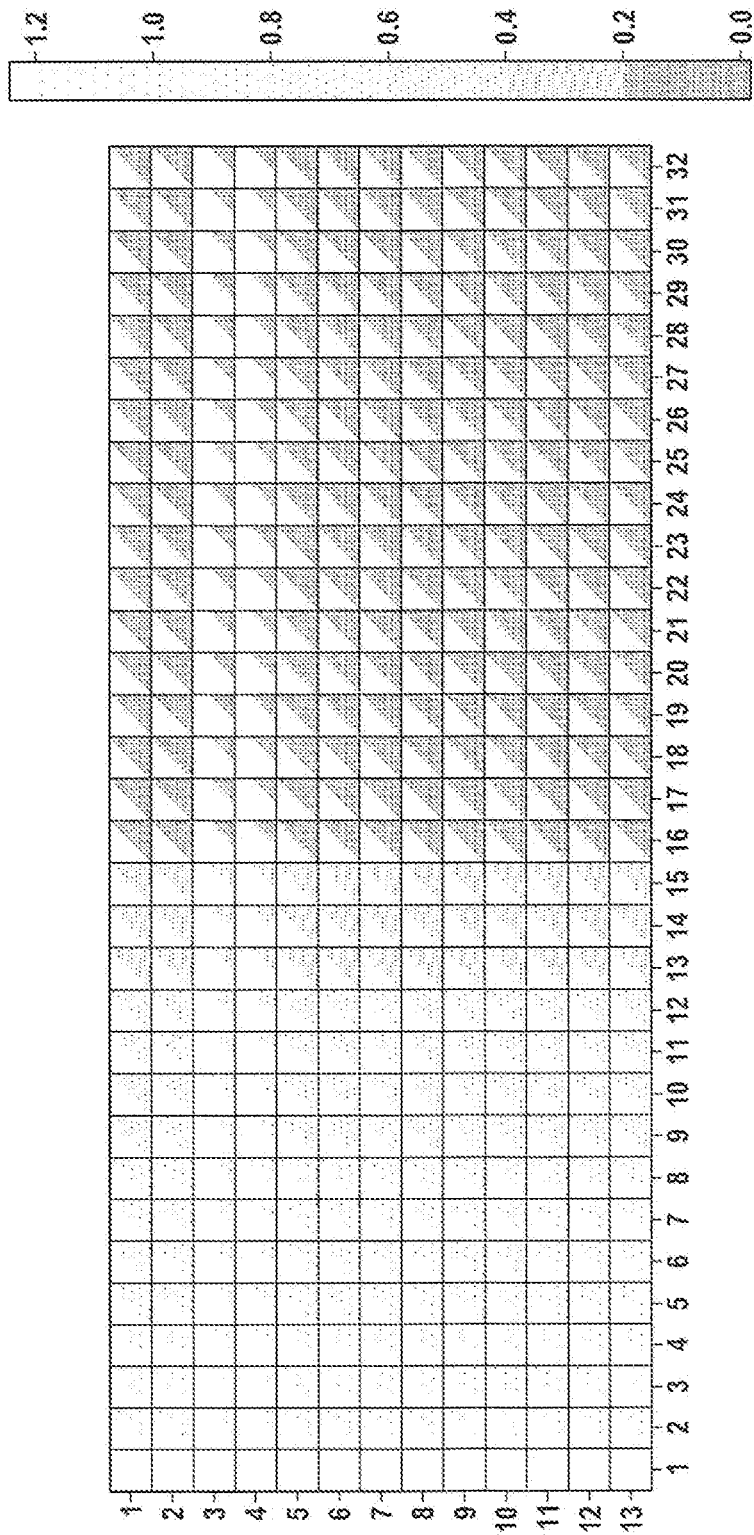
FIG. 6 shows an exemplary representation of the development of the elements of the compression matrices for a neural network including 13 neuron layers during a training for 30 training cycles, the gray shades indicating the element values.

FIG. 6 illustrates the development of the element values of the assigned compression matrices for 30 training cycles by way of example for a neural network including 13 neuron layers to each of which a compression matrix is assigned, the gray shades indicating the element values.

The above method is particularly efficient when the compression unit 3 is implemented as hardware. When such a hardware compression unit 3 processes, compresses and encodes the calculation results according to the above method by pipelining in a streaming mode, it is possible to increase the effective bandwidth in the direction of external memory 4. The same applies to decompression unit 5 for reading back, back-transforming and decoding the frequency domain tiles of the intermediate result or of the feature maps from external memory 4 according to the above procedure.

Since the transmission of data to an external memory 4 requires a lot more energy and is much more time-consuming than the internal calculations and register accesses, the implementation of compression unit 3 and of decompression unit 5 allows the power consumption to be reduced, and the data throughput per unit size to be increased.

The above-described calculation system and the corresponding method may be used, for example, for the processing of image data of camera images in motor vehicle applications. Image data recorded by a camera system are processed by the neural network of the calculation system, for example to implement an object identification method, a segmentation method or other classification methods for the image data. The image data thus processed (segmented or classified) may then be used in a manner known per se in a driver assistance system or a system for autonomously operating the motor vehicle.

What is claimed is:

1. A method for operating a calculation system including a neural network, the neural network including a sequence of neuron layers, the calculation system including a processing unit for sequential calculations of the neural network and an external memory external thereto that buffers intermediate results of the sequential calculations in the processing unit, the method comprising:
incrementally calculating in a first step of the sequential calculations, using data sections of an input feature map, data sections of an output feature map which each represent a group of intermediate results, using a first one of the neuron layers of the neural network, the input feature map being used as input to the first one of the neuron layers, wherein the incremental calculations in the first step are performed on a data section by data section basis;
lossy compression of at least one of the data sections of the output feature map to obtain compressed intermediate results;
transmitting the compressed intermediate results to the external memory, wherein the external memory is external to the processing unit;

retrieving the compressed intermediate results from the external memory for calculations using a second one of the neuron layers of the neural network, the second one of the neuron layers being a different neuron layer than the first one of the neuron layers, and the second one of the neuron layers sequentially follows the first one of the neuron layers in the sequence of layers;

decompressing the retrieved compressed intermediate results to provide decompressed intermediate results;

incrementally calculating in a second step of the sequential calculations, using data sections of the decompressed intermediate results, data sections of a second output feature map which each represent a group of second intermediate results, using the second one of the neuron layers of the neural network, the decompressed intermediate results being used as input to the second one of the neuron layers of the neural network, wherein the incremental calculations in the second step are performed on a data section by data section basis;

lossy compression of at least one of the data sections of the second output feature map, to obtain compressed second intermediate results;

transmitting the compressed second intermediate results to the external memory;

retrieving the compressed second intermediate results from the external memory for additional calculations using a third one of the neuron layers of the neural network, the third one of the neuron layers being a different neuron layer than the first one of the neuron layers and the second one of the neuron layers, and the third one of the neuron layers sequential follows the second one of the neuron layers in the sequence of layers;

decompressing the retrieved compressed second intermediate results to provide decompressed second intermediate results;

performing, in a third step of the sequential calculations, the additional calculations on the decompressed second intermediate results using the third one of the neuron layers of the neural network, the decompressed second intermediate results being used as input to the third one of the neuron layers of the neural network.

2. The method as recited in claim 1, wherein, for the lossy compression, the data sections of the output feature map are each transformed into a frequency domain, and the transformed data sections are filtered element-wise to obtain modified data sections.

3. The method as recited in claim 2, wherein the element-wise filtering includes a multiplication of a portion of elements of the transformed data sections with 0 to obtain modified data sections including a number of "0" elements which is greater than a number of "0" elements in the data sections of the output feature map.

4. The method as recited in claim 2, wherein at least one of the modified data sections is encoded together, with the aid of a predefined encoding method to obtain the compressed intermediate results, with the aid of run length encoding or entropy encoding.

5. The method as recited in claim 4, wherein a compression matrix is applied to the transformed data sections for the element-wise filtering, the compression matrix being separately predefined for each calculation layer of the sequential calculation of the neural network.

6. The method as recited in claim 5, wherein the compression matrix is predefined in such a way that higher-frequency components of the transformed data sections are filtered.

7. The method as recited in claim 6, wherein the compression matrix is predefined in that, during a training of the neural network, matrix elements of the filter matrices for each calculation layer are trained together with neuron parameters of neurons of the neural network with the aid of a back-propagation method.

8. The method as recited in claim 1, wherein the neural network is a convolutional neural network including the multiple neuron layers, each of the neuron layers being assigned neuron parameters, one element of the output feature map being obtained by applying the neuron parameters assigned to the output feature map to a data section of the input feature map.

9. The method as recited in claim 1, wherein, after the retrieval of the compressed intermediate results from the external memory, the retrieved compressed intermediate results are decoded using a decoding method and are subsequently back-transformed to obtain the decompressed intermediate results.

10. A calculation system, comprising:
a convolutional neural network including a sequence of neuron layers;
a processing unit including a processor configured to perform sequential calculations of the neural network; and
a memory external to the processing unit configured to buffer intermediate results of the sequential calculations in the processing unit;
wherein the processing unit is configured to:
incrementally calculate in a first step of the sequential calculations, using data sections of an input feature map, data sections of an output feature map which each represent a group of intermediate results, using a first one of the neuron layers of the neural network, the input feature map being used as input to the first one of the neuron layers, wherein the incremental calculations in the first step are performed on a data section by data section basis;
conduct a lossy compression of at least one of the data sections of the output feature map to obtain compressed intermediate results; and
transmit the compressed intermediate results to the external memory;
wherein the calculation system is configured to retrieve the compressed intermediate results from the external memory and to decompress the retrieved compressed intermediate results to provide decompressed intermediate results;
wherein the processing unit is configured to:
incrementally calculate in a second step of the sequential calculations, using data sections of the decompressed intermediate results, data sections of a second output feature map which each represent a group of second intermediate results, using a second one of the neuron layers of the neural network, the second one of the neuron layers being a different neuron layer than the first one of the neuron layers, and the second one of the neuron layers sequentially follows the first one of the neuron layers in the sequence of neuron layers, the decompressed intermediate results being used as input to the second one of the neuron layers, wherein the incremental calculations in the second step are performed on a data section by data section basis;

conduct a lossy compression of at least one of the data sections of the second output feature map to obtain compressed second intermediate results;
transmit the compressed second intermediate results to the external memory;
wherein the calculation system is configured to:
retrieve the compressed second intermediate results from the external memory for further additional calculations using a third one of the neuron layers of the neural network, the third one of the neuron layers being a different neuron layer than the first neuron layer and the second neuron layer, and the third one of the neuron layers sequentially follows the second neuron layer in the sequence of neuron layers, and
decompress the retrieved compressed second intermediate results to provide decompressed second intermediate results; and
wherein the processing unit is configured to:
perform, in a third step of the sequential calculations, the additional calculations on the decompressed second intermediate results using the third one of the neuron layers of the neural network, the decompressed second intermediate results being used as input to the third one of the neuron layers of the neural network.

11. The calculation system as recited in claim 10, further comprising:
a decompression unit including hardware configured to retrieve the compressed intermediate results from the external memory, to decompress the retrieve compressed intermediate results, and to provide the decompressed intermediate results to the second one of the neuron layers as the input to the second one of the neuron layers.

12. A method of using a calculation system, the method comprising:
providing a calculation system, the calculation system including:
a convolutional neural network including multiple neuron layers;
a processing unit including a processor configured to perform sequential calculations of the neural network; and
a memory external to the processing unit configured to buffer intermediate results of the sequential calculations in the processing unit;
wherein the processing unit is configured to:
incrementally calculate in a first step of the sequential calculations, using data sections of an input feature map, data sections of an output feature map which each represent a group of intermediate results, using a first one of the neuron layers of the neural network, the input feature map being used as input to the first one of the neuron layers, wherein the incremental calculations in the first step are performed on a data section by data section basis,
conduct a lossy compression of at least one of the data sections the output feature map to obtain compressed intermediate results, and
transmit the compressed intermediate results to the external memory;
wherein the calculation system is configured to retrieve the compressed intermediate results from the external memory and to decompress the retrieved compressed intermediate results to provide decompressed intermediate results;
wherein the processing unit is further configured to:
incrementally calculate in a second step of the sequential calculations, using data sections of the decompressed intermediate results, data sections of a second output feature map which each represent a group of second intermediate results, using a second one of the neuron layers of the neural network, the second one of the neuron layers being a different neuron layer than the first one of the neuron layers, and the second one of neuron layers sequentially follows the first one of the neuron layers in the sequence of neuron layers, the decompressed intermediate results being used as input to the second one of the neuron layers, wherein the incremental calculations in the second step are performed on a data section by data section basis;
conduct a lossy compression of at least one of the data sections of the second output feature map to obtain compressed second intermediate results;
transmit the compressed second intermediate results to the external memory;
wherein the calculation system is configured to:
retrieve the compressed second intermediate results from the external memory for further additional calculations using a third one of the neuron layers of the neural network, the third one of the neuron layers being a different neuron layer than the first neuron layer and the second neuron layer, and the third one of the neuron layers sequentially follows the second neuron layer in the sequence of neuron layers, and
decompress the retrieved compressed second intermediate results to provide decompressed second intermediate results; and
wherein the processing unit is configured to:
perform, in a third step of the sequential calculations, the additional calculations on the decompressed second intermediate results using the third one of the neuron layers of the neural network, the decompressed second intermediate results being used as input to the third one of the neuron layers of the neural network;
processing, using the calculation system, image data of camera images in (i) a driver assistance system for carrying out a driver assistance function, or (ii) a system for autonomously operating the motor vehicle, to carry out an object identification method, a segmentation method or a classification method for the image data.

13. A non-transitory machine-readable storage medium on which is stored a computer program for operating a calculation system including a neural network, the neural network including a sequence of neuron layers, the calculation system including a processing unit for sequential calculations of the neural network and an external memory external thereto that buffers intermediate results of the sequential calculations in the processing unit, the computer program, when executed by the calculation system, causing the calculating system to perform:
incrementally calculating in a first step of the sequential calculations, using data sections of an input feature map, data sections of an output feature map which each represent a group of intermediate results, using a first one of the neuron layers of the neural network, the input feature map being used as input to the first one of the neuron layers, wherein the incremental calculations in the first step are performed on a data section by data section basis;

lossy compression of at least one of the data sections of the output feature map to obtain compressed intermediate results;

transmitting the compressed intermediate results to the external memory, wherein the external memory is external to the processing unit;

retrieving the compressed intermediate results from the external memory for calculations using a second one of the neuron layers of the neural network, the second one of the neuron layers being a different neuron layer than the first one of the neuron layers, and the second one of the neuron layers sequentially follows the first one of the neuron layers in the sequence of neuron layers;

decompressing the retrieved compressed intermediate results to provide decompressed intermediate results;

incrementally calculating in a second step of the sequential calculations, using data sections of the decompressed intermediate results, data sections of a second output feature map which each represent a group of second intermediate results, using the second one of the neuron layers of the neural network, the decompressed intermediate results being used as input to the second one of the neuron layers of the neural network, wherein the incremental calculations in the second step are performed on a data section by data section basis;

lossy compression of at least one of the data sections of the second output feature map, to obtain compressed second intermediate results;

transmitting the compressed second intermediate results to the external memory;

retrieving the compressed second intermediate results from the external memory for additional calculations using a third one of the neuron layers of the neural network, the third one of the neuron layers being a different neuron layer than the first one of the neuron layers and the second one of the neuron layers, and the third one of the neuron layers sequentially following the second one of the neuron layers in the sequence of neuron layers;

decompressing the retrieved compressed second intermediate results to provide decompressed second intermediate results;

performing, in a third step of the sequential calculations, the additional calculations on the decompressed second intermediate results using the third one of the neuron layers of the neural network, the decompressed second intermediate results being used as input to the third one of the neuron layers of the neural network.

* * * * *